N. B. THOMPSON.
BOARD BUNDLING MACHINE.
APPLICATION FILED NOV. 10, 1913.
1,152,670.
Patented Sept. 7, 1915.
5 SHEETS—SHEET 5.
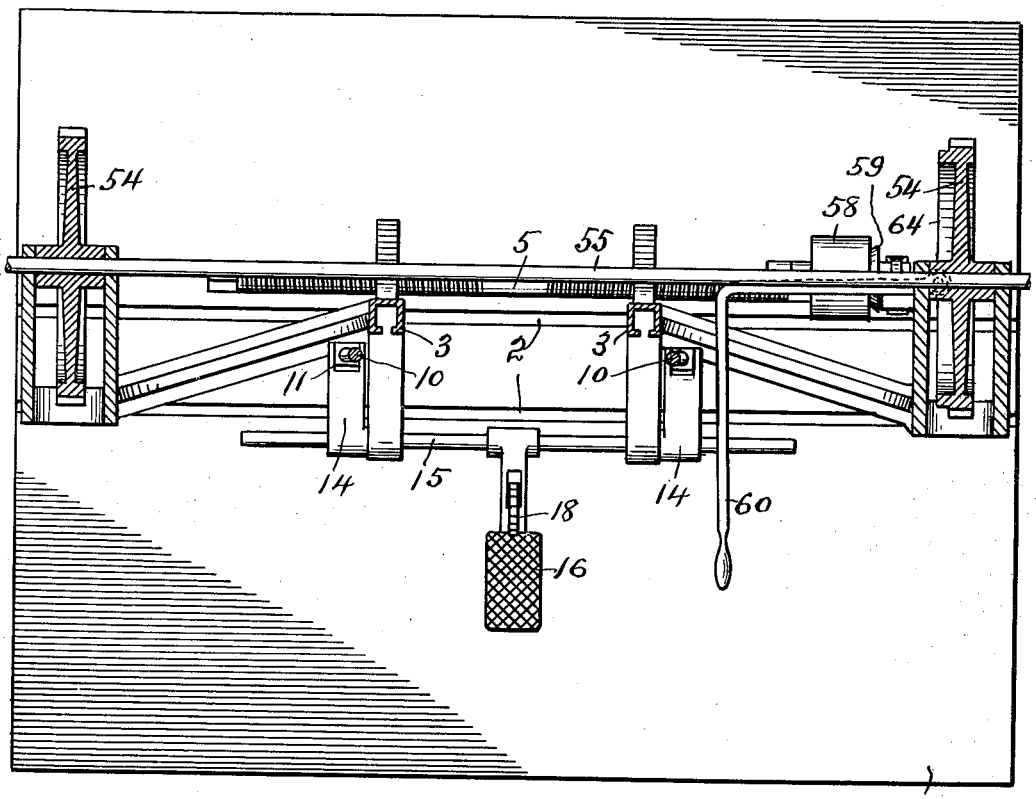
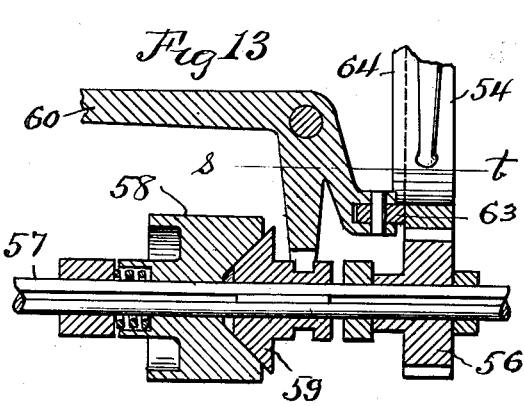
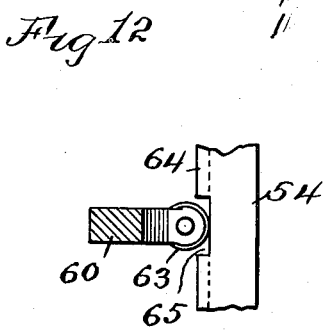
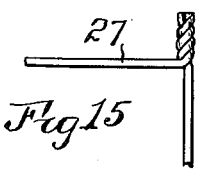
WITNESSES:
R. C. Hamilton
E. B. House
INVENTOR.
Newton B. Thompson
BY Warren D. House
His ATTORNEY.

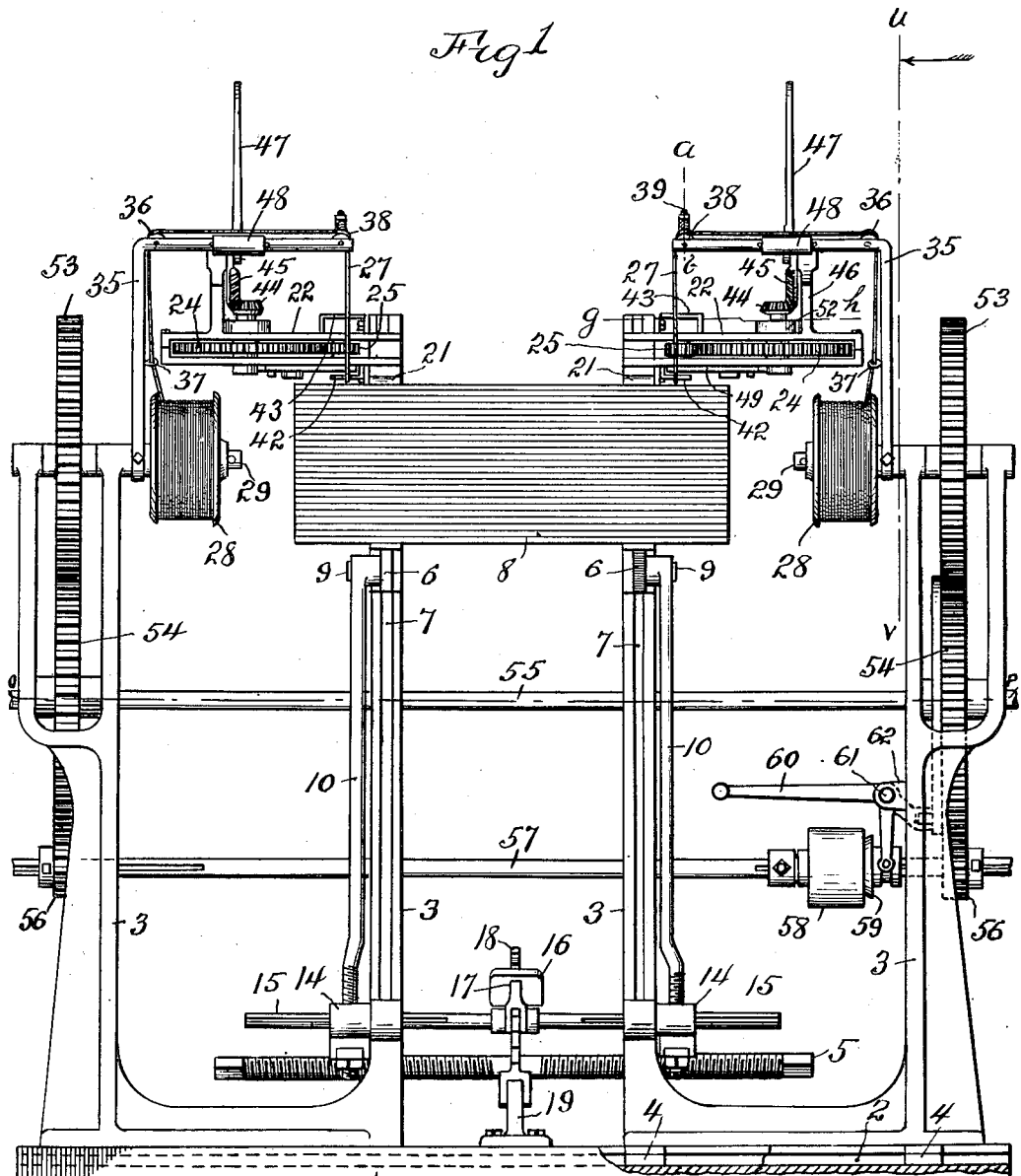

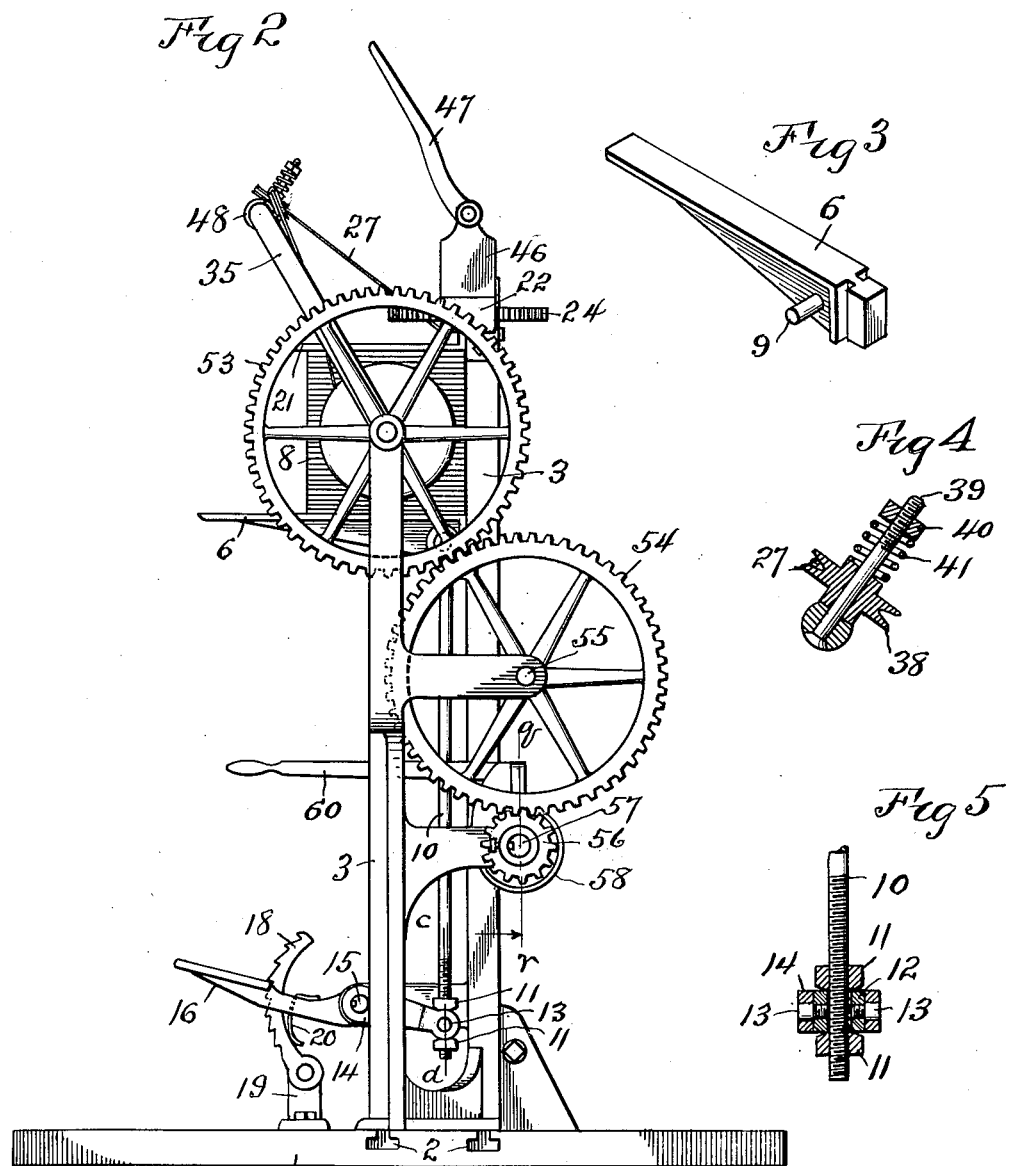

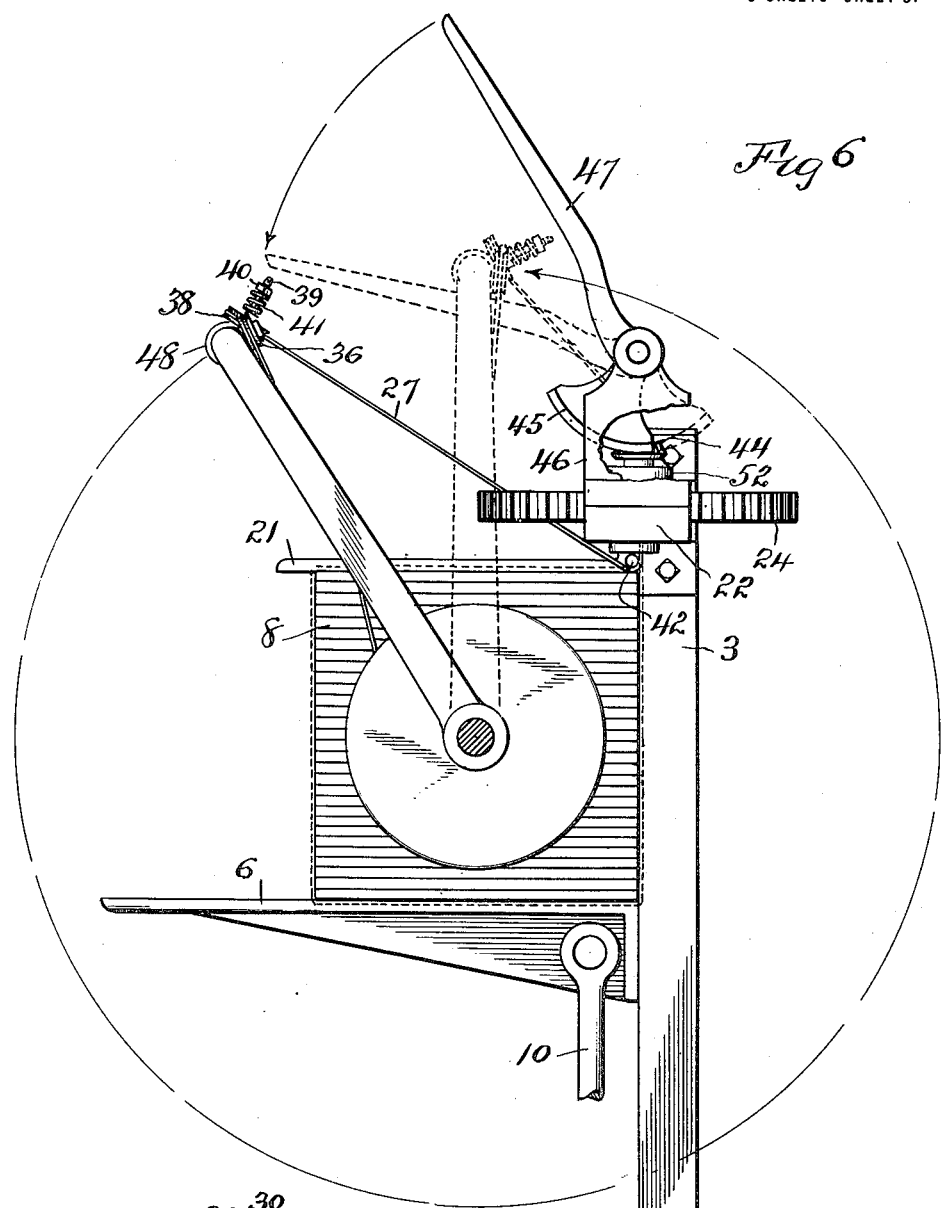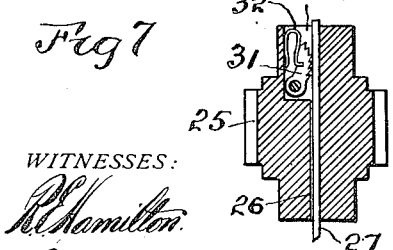

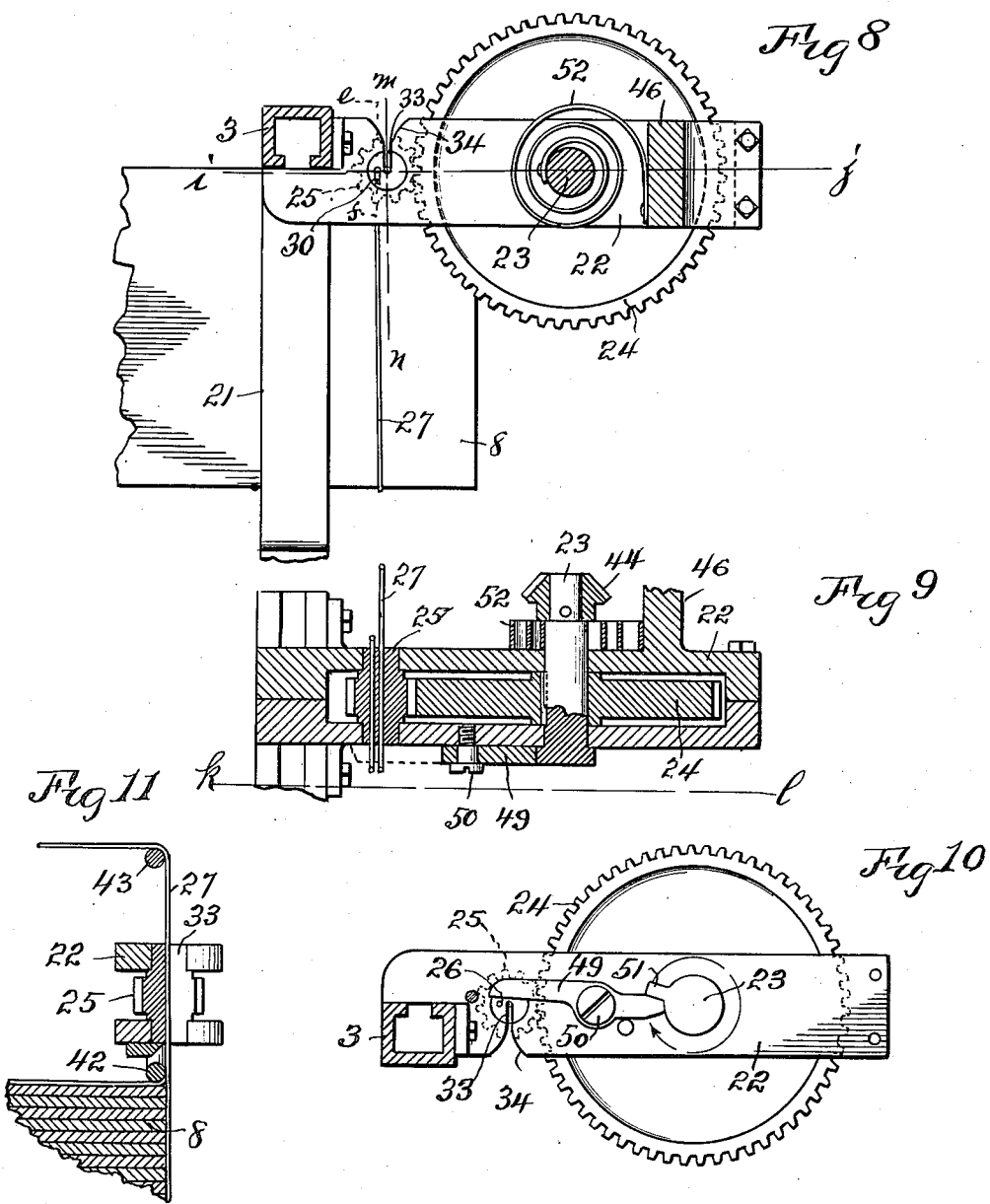

UNITED STATES PATENT OFFICE.

NEWTON B. THOMPSON, OF KANSAS CITY, KANSAS.

BOARD-BUNDLING MACHINE.

1,152,670.  Specification of Letters Patent.  Patented Sept. 7, 1915.

Application filed November 10, 1913. Serial No. 800,126.

*To all whom it may concern:*

Be it known that I, NEWTON B. THOMPSON, a citizen of the United States, residing at Kansas City, in the county of Wyandotte and State of Kansas, have invented certain new and useful Improvements in Board-Bundling Machines, of which the following is a specification.

My invention relates to improvements in board bundling machines.

The object of my invention is to provide a machine by which boards adapted to form boxes may be quickly and securely bound with wire into bundles for convenience in storing and shipping.

A further object of my invention is to provide a machine which may be readily adjusted to suit piles of boards of different dimensions.

Other novel features of my invention are hereinafter fully described and claimed.

In the accompanying drawings which illustrate the preferred embodiment of my invention—Figure 1 is a front elevation of the machine, having mounted thereon a pile of boards. Fig. 2 is a side elevation of the machine. Fig. 3 is a perspective view of one of the vertically adjustable board supports. Fig. 4 is a cross section, enlarged, on the line a—b of Fig. 1. Fig. 5 is an enlarged vertical sectional view, on the line c—d of Fig. 2. Fig. 6 is an enlarged sectional view, partly broken away of the loop forming and twisting mechanism and parts adjacent thereto, on the line u—v of Fig. 1. Fig. 7 is an enlarged vertical sectional view, of the wire engaging pinion, taken on the plane of the line e—f of Fig. 8. Fig. 8 is an enlarged horizontal section, on the line g—h of Fig. 1. Fig. 9 is a vertical section, on the line i—j of Fig. 8. Fig. 10 is a horizontal section, looking upwardly, on the line k—l of Fig. 9. Fig. 11 is a vertical sectional view, enlarged, on the line m—n of Fig. 8. Fig. 12 is a horizontal section on the line o—p of Fig. 1. Fig. 13 is a vertical section, enlarged, on the line q—r of Fig. 2. Fig. 14 is a cross section, on the line s—t of Fig. 13. Fig. 15 is a view of a portion of the wire loop, after the twisting operation has been completed and the wires severed.

Similar reference characters designate similar parts.

1 designates a horizontal base plate, provided with two parallel grooves 2.

Mounted on the base plate 1, are two U-shaped upstanding supports or standards 3, which have lugs 4, slidably mounted in the grooves 2, and which are adjustable toward and from each other by means of a horizontal bar 5, provided respectively at its ends with right and left hand threads, which are respectively fitted in threaded holes provided in the two standards 3. For the purpose of turning with a wrench the ends of the bar 5 are squared.

6 designates two horizontal supporting bars, the rear ends of which are slidably mounted in vertical slots 7, provided in the inner vertical arms of the standards 3. The bars 6 are adapted to support the pile of boards 8, which are to be bound with wire. The bars 6 are provided with horizontal cylindrical projections 9, to which are respectively pivoted the upper ends of two vertical bars 10, the lower ends of which are screw threaded, see Figs. 2 and 5, each bar having mounted thereon two nuts 11, between which is mounted a collar 12, through which the rod 10 extends. Each collar 12 is provided with screw trunnions 13, to which are pivoted the inner ends of two crank members 14, which are longitudinally slidable on and have a feather and groove connection with a horizontal rock shaft 15, which is pivotally mounted in the inner vertical arms of the standards 3, and has rigidly secured to it a treadle 16, having a vertical slot 17, through which extends a vertical curved pawl 18, the lower end of which is secured to a standard 19, secured to the top of the base 1. A spring 20, Fig. 2, secured to the treadle 16, normally holds the curved pawl 18, engaged with the treadle 16. The convex side of the pawl 18 is provided with ratchet teeth, adapted to hold the treadle from upward movement, but permitting its downward movement.

To the upper ends of the inner arms of the standards 3, are secured the rear ends of forwardly extending horizontal arms 21, against which is adapted to bear the upper end of the pile of boards 8.

The threaded bar 5 is turned so as to move the standards 3, to positions adapted to the length of the boards to be bound.

The boards are then placed upon the bars 6 and the treadle 16 depressed with the foot until the top boards of the pile are brought against and held clamped to the arms 21. The pile is then ready to be bound with wire. Preferably the pile is bound adjacent to opposite ends with two wire loops. The mechanism for forming the loops and twisting and cutting the wires thereof are alike so that a description of one of these mechanisms will suffice for both.

Secured to and extending outwardly from the upper ends of the inner arms of the standards 3, are horizontal brackets 22, best shown in Figs. 1 and 8 to 10. Rotatively mounted in each bracket 22, is a vertical shaft 23, to which is secured a spur gear wheel 24, which meshes with a pinion 25, also rotatively mounted in the bracket 22, and provided with a vertical hole 26, see Fig. 7, which is parallel with but eccentric to the axis of the pinion and which is adapted to receive the end of a wire 27, which is preferably drawn from a roll carried on a spool or reel 28, which is rotatively mounted on a horizontal shaft 29, which is rotatively mounted in the upper end of the outer arm of the adjacent standard 3. The pinion 25, as shown in Fig. 7, is provided in its upper end with a slot 30, in which is pivoted a toothed cam 31, the teeth of which are of ratchet form and are held engaged with the wire 27 by means of a spring 32. As shown in Figs. 8 to 11, the pinion 25 is provided with a longitudinal peripheral groove 33, which is adapted to receive a second portion of the wire when the loop is formed around the bundle. The slot 33 is adapted to register with a vertical slot 34, provided in the rear side of the bracket 22. For the purpose of forming the wire into a loop, I provide a revoluble member consisting of a right angled arm 35, which has its radial portion secured rigidly to the rotary shaft 29, and has a horizontal portion carrying a grooved pulley 36, disposed adjacent to the angle of the arm. The wire 27 is passed from the spool 28, through an eye 37, on the radial portion of the arm 35, thence over the pulley 36, and from thence over a pulley 38, which is rotatably mounted on a pin 39, Fig. 4, which is secured to and extends at right angles from the horizontal, inwardly extending portion of the arm 35. The outer end of the pin 39 is screw threaded and has fitted on it a nut 40, against which bears one end of a coil spring 41, the other end of which bears against the grooved pulley 38, for the purpose of affording frictional means for retarding rotation of said pulley. From the pulley 38 the wire 27 is passed under a horizontal outwardly extending rod 42, Fig. 11, which is secured to the under side of the adjacent bracket 22, and has its rear side flush with the rear side of the pile 8, and also with the axis of the pinion 25. Secured to the upper side of each bracket 22 is a transverse right angled bar 43, Fig. 11, which is disposed parallel with the bar 42.

From the foregoing it will be understood that when the shaft 29 is rotated the arm 35 will be revolved and its horizontal portion will describe a circle around the pile 8, as shown by the curved dotted line in Fig. 6, and the wire 27 will be drawn off from the roll, which is carried by the spool 28, and will be tightly bound around the pile 8, as shown in dotted lines in Fig. 6, the wire finally being passed through the slot 34 and into the slot 33 of the pinion 25. At this time, rotation is imparted to the pinion, thereby twisting the ends of the loop which has been formed around the pile, as shown in Fig. 15. For the purpose of rotating the pinion, it has meshing with it the gear wheel 24, which is secured to the shaft 23, as hereinbefore described. The upper end of the shaft 23 has secured to it a bevel gear wheel 44, which meshes with a segmental bevel gear wheel 45, which is pivoted to an upwardly extending arm 46, of the bracket 22, and has secured to it a lever 47, which is adapted to be struck by a roller 48, mounted on the horizontal portion of the arm 35. When the arm 35 has carried the wire into the slot 33, the roller 48 will contact with the lever 47 and will swing said lever, on continued revolution of the arm 35, to the position shown in dotted lines in Fig. 6, the segmental gear 45, in the meantime, rotating the bevel gear wheel 44 and with it the shaft 23 and gear wheel 24, thereby rotating the pinion 25 so as to twist the wire. After several turns have been made in the wire it is severed by means of a blade 49, Fig. 10, which is pivoted on a vertical screw 50, secured in the lower side of the adjacent bracket 22, the upper side of the knife being in contact with the lower end of the pinion 25. The knife 49 is operated by means of a laterally extending lug 51, provided on the lower end of the shaft 23, the lug traveling in the direction indicated by the arrow in Fig. 10. After the wire has been severed, the roller 48 will pass off from the lever 47, and the pinion 25, gear wheel 24, shaft 23, and lever 47, will be retracted to the initial positions, shown in solid lines in Fig. 6, and in Fig. 8, by an involute spring 52, one end of which is attached to the adjacent bracket 22 and the other end of which is attached to the adjacent shaft 23. When the shaft 23 has been retracted to its initial position, it will have engaged the knife 49 and swung it to the initial position shown in Fig. 10. After the wire has been severed, the upper end of the ratchet pawl 18 is forced rearwardly, thus releasing the treadle 16, upon which the supports 6 will lower with the bound pile, which may be removed and replaced with another pile. When this has been done, the short piece of wire which remains in the hole 26 of the pinion 25, will be removed and the end of the wire, which is in the slot 33, will be removed therefrom and then inserted upwardly through the hole 26, into engagement with the toothed cam 32, after which the operation hereinbefore described may be repeated.

I will now describe the mechanism by which the shafts 29 are rotated:—Secured respectively to said shafts 29, are two gear wheels 53, which mesh with intermediate gear wheels 54, slidably mounted on a horizontal bar 55, which is also slidably mounted in the standards 3. The gear wheels 54 mesh with pinions 56, which are longitudinally slidable on and have a feather and groove engagement with a horizontal shaft 57, which is rotatably and slidably mounted in the arms of the standards 3. The shaft 57 is driven by a driving pulley 58, rotatably mounted thereon, and provided with a concave clutch face at one end thereof, adapted to coöperate with and drive a clutch member 59, which is longitudinally slidable and has a feather and groove connection with the driven shaft 57, as shown in Fig. 13. For moving the clutch member 59 into engagement with the driving pulley 58, said clutch member is engaged in the usual manner by a right angled lever 60, which is pivotally mounted, by means of a horizontal pin 61, to a lug 62, provided on the inner side and outer arm of one of the standards 3. The lever 60 has mounted on it a roller 63, which is adapted to run on an annular flange 54, provided concentrically on the inner side of the adjacent intermediate gear wheel 54. The annular flange 64 at one point is provided with a notch 65, Fig. 14, which permits the passage therein of the roller 63, whereupon the lever 60 will swing so as to permit disengagement of the clutch member 59 from the driving pulley 58.

In starting the machine, the operator swings the lever 60 so as to force the clutch member 59 tightly against the driving pulley 58, whereupon the shaft 57 will be driven and the arms 35 will be revolved, by the mechanism hereinbefore described, so as to loop the wires around the bundle and then twist and cut the wires, in the manner hereinbefore described. After the wires have been cut, the roller 63 which, in the meantime, has been traveling on the annular flange 64, and thereby holding the clutch member 59 engaged with the pulley 58, will drop into the notch 65, whereupon the mechanism will stop.

I do not limit my invention to the structure described and illustrated, as modifications, within the scope of the appended claims, may be made without departing from the spirit of the invention.

Having thus described my invention, what I claim and desire to secure by Letters Patent, is:—

1. In a board bundling machine, means for supporting and holding compressed a pile of boards, a revoluble member adapted to revolve around said pile and having means for engaging a wire and looping it tightly around and against the entire periphery of said pile, and means for holding one end of the looped wire and for twisting together the meeting portions of said looped wire while the pile is held compressed.

2. In a board bundling machine, means for supporting and holding compressed a pile of boards, a revoluble member adapted to revolve around said pile and having means for engaging a wire, drawing it from a roll and looping it tightly around and against the entire periphery of said pile, means for holding one end of the looped wire and for twisting together the meeting portions of said looped wire while the pile is held compressed, and means for severing the looped portion from the roll.

3. In a board bundling machine, means for supporting and holding compressed a pile of boards, a rotary member having means for holding one end of a wire and for receiving a second portion of the wire and, when rotated, being adapted to twist together the two portions of wire held thereby, means for forming the wire into a loop tightly around and against the entire periphery of said pile and for bringing said second portion into engagement with said rotary member, and means actuated by said loop forming means for rotating said rotary member after said second portion has been engaged by said rotary member while the pile is held compressed.

4. In a board bundling machine, means for supporting a pile of boards, a rotary member having means for holding one end of a wire, and having a longitudinal peripheral slot for receiving a second portion of said wire, a revoluble member having means for engaging the held wire and looping it around said pile and bringing said second portion into said slot, and means actuated by said revoluble member for rotating the rotary member after said second portion has been brought into said slot, thereby twisting together the ends of said loop.

5. In a board bundling machine, means for supporting and holding compressed a pile of boards, a rotary member having means for holding one end of a wire and for receiving a second portion of the wire, a revoluble member adapted to revolve around said pile and having means for engaging said wire, drawing it from a roll and looping it tightly around and against the entire periphery of said pile and for bringing said second portion into engagement with said rotary member, means for rotating said rotary member, after said second portion has been engaged thereby while the pile is held compressed, and means for severing the looped portion of the wire from the roll.

6. In a board bundling machine, means for supporting a pile of boards, a rotary member having means for holding one end of a wire and for engaging a second portion of the wire, said holding and engaging means being arranged to twist the wire when the rotary member is rotated, a lever, means actuated by the lever for rotating said rotary member, and means for looping the held wire around said pile, bringing said second portion into engagement with said rotary member and for swinging said lever after said second portion has engaged said rotary member.

7. In a board bundling machine, means for supporting a pile of boards, a pinion having means for holding one end of a wire and provided with a longitudinal peripheral slot, the slot and holding means being arranged to twist the wire when the pinion is rotated, a rotary shaft, a gear wheel secured to said shaft and meshing with said pinion, means for rotating said shaft in one direction, means for rotating said shaft in the opposite direction, and means for engaging said held wire and looping it around said pile and bringing it into said slot, one of said shaft rotating means being actuated by said loop forming means after the wire has been carried into said slot.

8. In a board bundling machine, means for supporting a pile of boards, a pinion having means for holding one end of a wire and provided with a longitudinal peripheral slot, the slot and holding means being arranged to twist the wire held therein when the pinion is rotated, a rotary shaft, a gear wheel carried by said shaft and rotatable therewith and meshing with said pinion, a lever, means actuated by the lever for rotating the shaft in one direction, means for retracting the shaft, and means for engaging the held wire, looping it around said pile and bringing it into said slot and for then engaging and swinging said lever.

9. In a board bundling machine, a pinion having means for holding one end of a wire, and having means for engaging a second portion of the wire, a rotary shaft, a gear wheel secured to said shaft and meshing with said pinion, a lever, means actuated by the lever for turning the shaft in one direction, means for retracting said shaft, and a revoluble member having means for engaging the held wire, forming a loop thereof, bringing said second portion into engagement with said pinion and for swinging said lever.

10. In a board bundling machine, a rotary member having means for holding one end of a wire and for engaging a second portion thereof, a rotary shaft, means actuated by said shaft for rotating said rotary member, a lever, means actuated by said lever for rotating said shaft in one direction, means for retracting said shaft, and a revoluble member having means for engaging said held wire, forming a loop thereof, bringing it into engagement with said rotary member, and for operating said lever after said second portion has been engaged by said rotary member.

In testimony whereof I have signed my name to this specification in presence of two subscribing witnesses.

NEWTON B. THOMPSON.

Witnesses:
   E. B. House,
   Warren D. House.